June 3, 1941.   H. FÖTTINGER ET AL   2,244,453
SCAVENGING OF TWO-STROKE CYCLE INTERNAL COMBUSTION ENGINES
Filed Dec. 3, 1938   2 Sheets-Sheet 1

Inventors
H. Föttinger
R. Wille

Attorney:
C. F. Wenderoth

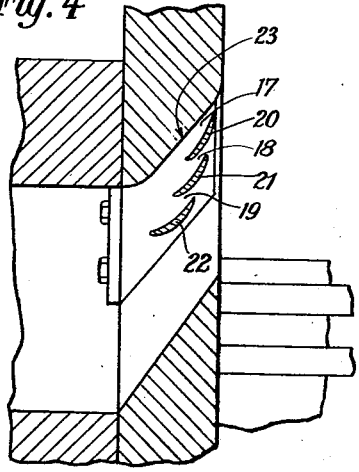
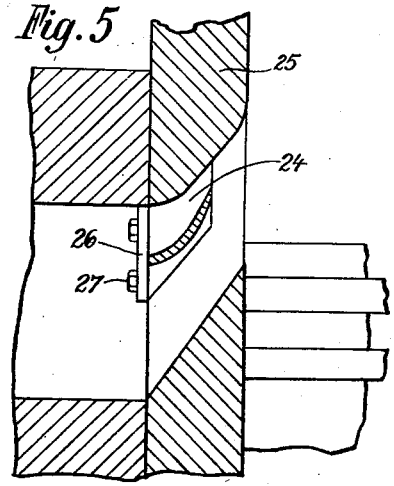
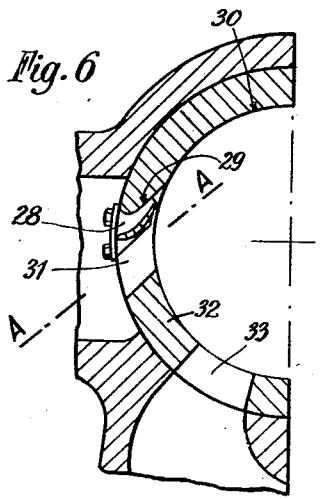
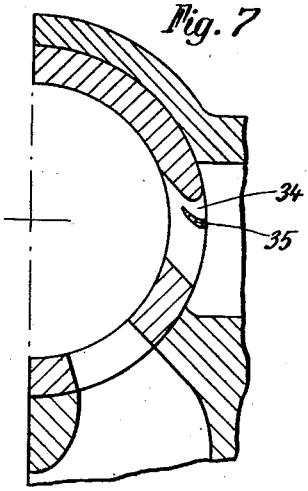
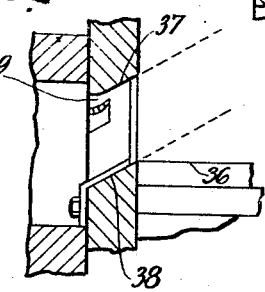

Patented June 3, 1941

2,244,453

UNITED STATES PATENT OFFICE 2,244,453

SCAVENGING OF TWO-STROKE CYCLE INTERNAL COMBUSTION ENGINES

Hermann Föttinger, Berlin-Wilmersdorf, and Rudolf Wille, Berlin-Charlottenburg, Germany Application December 3, 1938, Serial No. 243,870
In Germany December 4, 1937

10 Claims. (Cl. 123—65)

This invention relates to two-stroke cycle internal combustion engines having piston-controlled scavenging and exhaust ports, and, more particularly, to means for deflecting the flow of the scavenging medium, or a part thereof, in a desired direction. This direction of flow may be either in an axial direction approximately parallel to the wall of the cylinder or it may be in the peripheral direction approximately parallel to the walls of the inlet passages for the scavenging medium. A primary object of the invention is entirely to prevent the scavenging air from flowing in a direct path from the inlet to the exhaust and to obviate too great a mixing of fresh air with the exhaust gases.

The means hitherto adopted for deflecting the flow of scavenging air into the axial direction consisted of pistons of special form, and provided with projections or slots for the displacement of the boundary layer at the place where the change in the direction of flow takes place. The means hitherto employed for deflecting the flow of scavenging air into the peripheral direction consisted of long guide passages or closely set grids, namely so-called "rectifiers."

The present invention obviates the necessity for the aforesaid parts as well as the disadvantages, such as accumulation of heat, constriction of cross sections, throttling and so forth, which are associated with their use by the arrangement or formation of separate nozzles in the inlet passages for the scavenging air. These nozzles are fitted in such a manner that they conduct a part of the stream of scavenging air in the form of a jet into the vicinity of the place where the change in direction is to take place where they blow away any dead fluid of the boundary layer which collects and thereby eliminate from the start any tendency for eddies to form. In this way the small but highly accelerated partial stream exerts a governing effect on the large main stream similarly as is the case with foresails and mainsails or with slotted aerofoils.

These nozzles occupy only a small portion of the cross-section of the inlet passage and leave the greater part of the cross-section free from obstruction.

In order that the invention may be readily understood and carried into effect various forms of construction in accordance with the invention are illustrated by way of example in the accompanying drawings, in which Figure 1 is a vertical section through the cylinder of a two-stroke cycle internal combustion engine in which the scavenging air ports are situated opposite the exhaust ports.

Figures 2-5 are vertical sections showing different forms of construction of nozzles for deflecting the stream of scavenging air in the axial direction.

Figures 6 and 7 are horizontal half-sections through the scavenging air ports of engine cylinders in which the scavenging air ports are situated beside the exhaust ports, and Figure 8 is a section on the line A—A of Figure 6.

Figure 1:
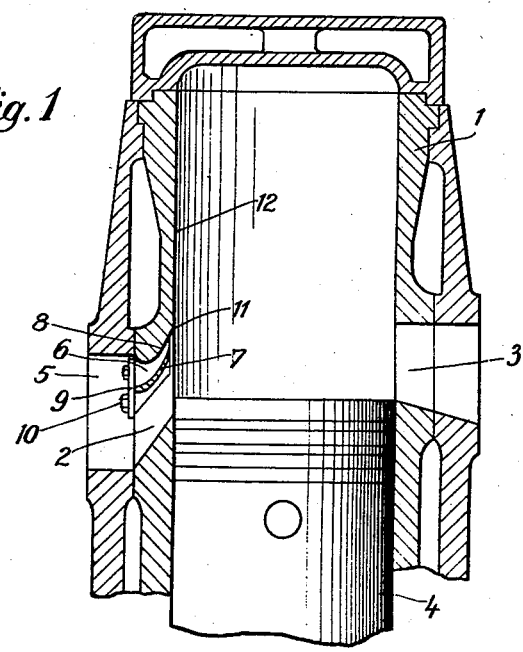

Referring to the drawings, in Figure 1 the numeral 1 designates the cylinder liner having an inlet port 2 for the scavenging air, an exhaust port 3 and a piston 4. The scavenging air from a receiver 5 enters the scavenging air port 2 in which a nozzle 6 is formed. The nozzle 6 is formed, for example, by a sheet metal blade 7 which is fixed at a small distance from the wall 8 of the port or passage 6, for example by means of a flange 9 and screws 10, in such a manner that the stream of air which is branched off is conducted to the vicinity of the point 11 where the direction of flow is to be changed. Owing to the effect, previously described, which is due to the nozzle, the formation of eddies in this region is suppressed and the main stream flows upwardly approximately parallel to the wall 12 of the cylinder.

Figure 2:
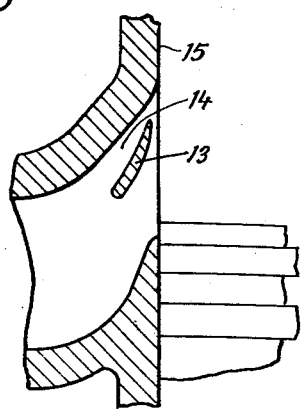

In the construction according to Figure 2 the part 13 which forms the wall of the nozzle 14 is cast together with the cylinder liner 15.

Figure 3:
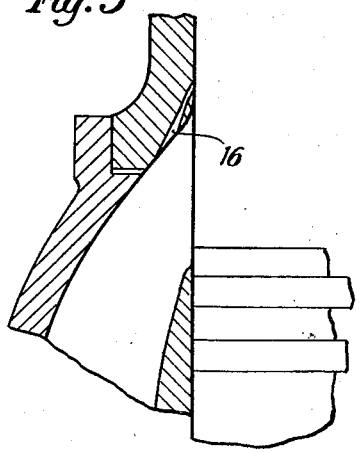

According to Figure 3 the nozzle 16 is formed by a cylindrical or conical bore in the cylinder liner.

Figure 4 illustrates an arrangement having three staggered nozzles 17, 18 and 19 which are formed by the blades 20, 21 and 22 and the upper wall 23 of the inlet port or passage. The nozzles formed are so arranged that the partial streams blow away the dead mass of the boundary layer from the back of the following blade. One of the important differences as compared with the device described in the U. S. Patent No. 1,837,901 of one of the present applicants which relates to guiding surfaces disposed at or beside sharp bends, is that, according to the present invention, the nozzle walls or blades are entirely in front of the bend.

Figure 5 shows a short nozzle 24 which in accordance with the invention, is fixed on the inlet side of the scavenging air passage in the liner 25 by means of a flange 26 and screws 27.

Figure 6 explains how with the aid of similarly arranged nozzles 28, the stream of scavenging air can be deflected also in the peripheral direction, for example in a plane parallel to the base of the piston towards the wall 29 and 30. For this purpose quite short passages 31 in the liner 32 are sufficient, whereas hitherto either much longer passages, which necessitated an undesirable increase in the dimensions of the cylinder, or complete guide grids or "rectifiers" which resulted in constriction and throttling, were necessary. In this figure the reference 33 represents the exhaust port.

Figure 7 illustrates similar deflecting means. In this case the nozzle 34 is considerably reduced in length and extends only over the inlet side of the scavenging air passage. The boundary wall 35 of the nozzle 34 is made of sheet metal or is of blade-like profile and cast in the liner.

Figure 8 is a vertical section through the scavenging air passage 31 of Figure 6 which is inclined slightly upwards relatively to the head 36 of the piston. In order to ensure an upward flow in the space within the dotted lines which are obtained by extending the walls 37 and 38 of the inlet passage, a small auxiliary nozzle 39 is additionally fitted near the upper wall 37 on the inlet side of the short inlet passage for the scavenging air. Then the flow is not only deflected in the peripheral direction, but is at the same time directed upwards with only quite short inlet passages.

Figure 9:
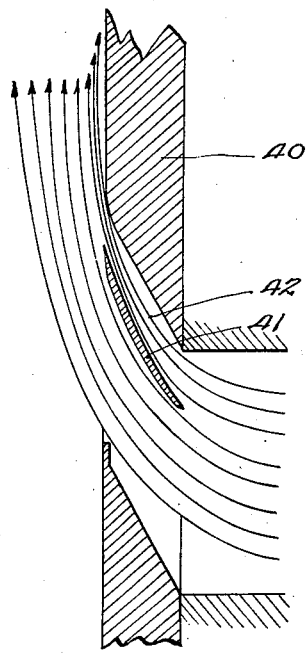
Figure 9 is a partial sectional view illustrating a scavenging passage according to the invention, in which a nozzle construction is inserted.

In Figure 9 the part 41 forms a wall of the nozzle 42 and the cylinder liner is shown at 40. In this figure the arrows indicate the streamlines of the air coming from the righthand side from the take-up space. Part of the streamlines, the upper ones, enter the nozzle passage, the cross-section of which is gradually decreasing. This imparts accelerated velocity to the air. The mouth of the nozzle passage is directed to the upper corner of the passage where the escaping stream of the nozzle agitates the boundary layer, namely blowing it off. This prevents the accumulation of dead boundary material at this place. A return eddy therefore cannot develop. The current of pure air can now flow upwardly, passing along the wall. Owing to the air escaping with special velocity from the nozzle and flowing along the wall, there is caused at this place a pressure below atmospheric pressure as compared with the other cylinder space. The entire scavenging air escaping from the remaining scavenging passage is attracted by a sucking action of the stream of the nozzle and the streamlines of the entire scavenging air are bent upwardly.

The invention is not limited to the forms of construction which have been illustrated in the drawings but is applicable to any desired arrangement of ports for obtaining the desired direction of flow with the simplest means.

We claim:

1. In a two-stroke cycle internal combustion engine having piston-controlled scavenging air and exhaust ports, a plurality of guide blades as parts of nozzles disposed in staggered relationship in the inlet passage to the scavenging air port, whereby a part of the scavenging air is caused to flow with increased velocity towards the place where the scavenging air port intersects the inner surface of the wall of the cylinder, so that the boundary layer at this place is blown away and the formation of eddies is prevented.

2. A two-stroke cycle internal combustion engine as claimed in claim 1, wherein said staggered guide blades are disposed wholly in front of said intersection between the scavenging air port and the inner surface of the wall of the cylinder.

3. In a two-stroke cycle internal combustion engine having piston-controlled scavenging air and exhaust ports, the provision of deflecting means whereby a part of the scavenging air is caused to flow with increased velocity in an axial direction in the cylinder and a part of the scavenging air is caused to flow with increased velocity in a peripheral direction in the cylinder.

4. A two-stroke cycle internal combustion engine as claimed in claim 3, having, in the inlet passage to the scavenging air port, a guide blade as a part of a nozzle adjacent an edge of said passage which is parallel to the head of the cylinder and a further guide blade as a part of a nozzle adjacent an edge which is parallel to the axis of the cylinder.

5. In a two-stroke cycle internal combustion engine having piston-controlled scavenging and exhaust ports, a nozzle construction located near the edge of said scavenging port converging towards the cylinder, said construction being so positioned as to direct a minor part of the scavenging fluid directly along the cylinder wall while the main part of said fluid flows freely through said scavenging port and is unimpeded by eddies which are prevented from forming by said minor part passing through said nozzle construction with increased velocity.

6. In a two-stroke cycle internal combustion engine having piston-controlled scavenging and exhaust ports, a nozzle construction located near the edge of said scavenging port converging towards the cylinder, said construction being so positioned as to direct a minor part of the scavenging fluid directly along the cylinder wall while the main part of said fluid flows freely through said scavenging port and is unimpeded by eddies which are prevented from forming by said minor part passing through said nozzle construction with increased velocity, said nozzle construction being cast in the cylinder wall.

7. In a two-stroke cycle internal combustion engine having piston-controlled scavenging and exhaust ports, a nozzle construction located near the edge of said scavenging port converging towards the cylinder, said construction being so positioned as to direct a minor part of the scavenging fluid directly along the cylinder wall while the main part of said fluid flows freely through said scavenging port and is unimpeded by eddies which are prevented from forming by said minor part passing through said nozzle construction with increased velocity, said nozzle construction being a bore in the cylinder wall leading said minor part of scavenging fluid to the inner surface of the cylinder wall adjacent its intersection with said scavenging port.

8. In a two-stroke cycle internal combustion engine having piston-controlled scavenging and exhaust ports, a nozzle construction located near the edge of said scavenging port converging towards the cylinder, said construction being so positioned as to direct a minor part of the scavenging fluid directly along the cylinder wall while the main part of said fluid flows freely through said scavenging port and is unimpeded by eddies which are prevented from forming by said minor part passing through said nozzle construction with increased velocity, said nozzle construction comprising a guide blade disposed adjacent to and in front of an edge of said scavenging port which is parallel to the cylinder axis so that said minor part of scavenging fluid is caused to flow in a peripheral direction in the cylinder.

9. In a two-stroke cycle internal combustion engine having piston-controlled scavenging and exhaust ports, scavenging ports inclined towards the cylinder head and scavenging ports directed in a circumferential direction, the combination comprising a nozzle construction located near the upper edge of said scavenging ports which are inclined towards the cylinder head, said nozzle construction formed between a guide blade inserted in the port and the upper wall of the port, said guide blade being inserted in such a manner, that its direction converges with the direction of the upper wall of the port thus forming an acute angle with said wall; said guide blade subdividing the port into a minor part, the said nozzle, and a larger part which is free of obstructions; said nozzle construction being so positioned as to direct a minor part of scavenging fluid round the edge of the scavenging port directly along the cylinder wall, while the main part of the scavenging fluid through said scavenging port runs uninfluenced by eddies which are prevented from forming at the edge by said minor part of fluid passing through said nozzle construction with increased velocity.

10. In a two-stroke cycle internal combustion engine having piston-controlled scavenging and exhaust ports, scavenging ports inclined towards the cylinder head and scavenging ports directed in a circumferential direction the combination comprising a nozzle construction located near the edge which is parallel to the cylinder axis of said scavenging ports which are directed in a circumferential direction, said nozzle construction being formed between a guide blade inserted in the port and a side-wall of the port which is more remote from the exhaust ports than the other side-wall; the guide blade inserted in such a manner that its direction converges with the direction of said side wall thus forming an acute angle with said wall; said guide blade subdividing the port into a minor part, the said nozzle, and a larger part which is free of obstructions; said nozzle construction being so positioned as to direct a minor part of scavenging fluid round the edge of the scavenging port directly along the cylinder wall, while the main part of the scavenging fluid through said scavenging port runs uninfluenced by eddies which are prevented from forming at the edge by said minor part of fluid passing through said nozzle construction with increased velocity.

HERMANN FÖTTINGER.
RUDOLF WILLE.